(12) United States Patent
Winemiller et al.

(10) Patent No.: US 9,829,958 B1
(45) Date of Patent: Nov. 28, 2017

(54) POWER SAVING SYSTEMS AND METHODS FOR UNIVERSAL SERIAL BUS (USB) SYSTEMS

(71) Applicant: QUALCOMM Incorporated, San Diego, CA (US)

(72) Inventors: Chad Everett Winemiller, Cary, NC (US); Jon Raymond Boyette, Holly Springs, NC (US); Russell Coleman Deans, Chapel Hill, NC (US); Zhi Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 15/150,586

(22) Filed: May 10, 2016

(51) Int. Cl.
*G06F 1/32* (2006.01)
(52) U.S. Cl.
CPC .......... *G06F 1/3278* (2013.01); *G06F 1/3237* (2013.01); *G06F 1/3287* (2013.01)
(58) Field of Classification Search
CPC .............................. G06F 1/3237; G06F 1/3278
See application file for complete search history.

(56) References Cited

U.S. PATENT DOCUMENTS

| 6,118,306 | A | 9/2000 | Orton et al. |
| 9,009,510 | B2 | 4/2015 | Tan |
| 9,223,385 | B2 | 12/2015 | Chen et al. |
| 2013/0185578 | A1* | 7/2013 | Tan ................... G06F 1/3234 713/323 |
| 2015/0067209 | A1 | 3/2015 | Liu et al. |
| 2015/0378418 | A1 | 12/2015 | Gerber et al. |

OTHER PUBLICATIONS

International Search Report and Written Opinion for PCT/US2017/027300, dated Jul. 12, 2017, 14 pages.

\* cited by examiner

*Primary Examiner* — Albert Wang
(74) *Attorney, Agent, or Firm* — Withrow & Terranova PLLC

(57) ABSTRACT

Power saving systems and methods for Universal Serial Bus (USB) systems are disclosed. When a USB physical layer (PHY) enters a U3 low power state, not only are normal elements powered down, but also circuitry within the USB PHY associated with detection of a low frequency periodic signal (LFPS) wake up signal is powered down. A low speed reference clock signal is still received by the USB PHY, and a medium speed clock within the USB PHY is activated once per period of the low speed reference clock signal. The medium speed clock activates the signal detection circuitry and samples a line for the LFPS. If no LFPS is detected, the signal detection circuitry and the medium speed clock return to low power until the next period of the low speed reference clock signal. If the LFPS is detected, the USB PHY returns to a U0 active power state.

25 Claims, 7 Drawing Sheets

POWER SAVING SYSTEMS AND METHODS FOR UNIVERSAL SERIAL BUS (USB) SYSTEMS

BACKGROUND

I. Field of the Disclosure

The technology of the disclosure relates generally to power saving techniques during low power operation of a Universal Serial Bus (USB) physical layer (PHY).

II. Background

Increased functionality has allowed computing devices to be used in many circumstances never contemplated at the time computing devices were introduced into commercial markets. In addition to the increased functionality, the types of computing devices have proliferated. Amongst the most popular computing devices are battery powered mobile computing devices such as smart phones and tablets. As the number of mobile computing devices has increased, so too has the demand that the devices perform multiple functions so that devices that may have originally been contemplated as a simple cellular telephone are now full multi-media telephonic and internet capable entertainment devices.

As noted above, mobile computing devices are typically battery powered. The increase in functionality and the corresponding use of such functions causes a corresponding drain on the batteries of the mobile computing devices. Consumers obviously find loss of power from an exhausted battery to be inconvenient, and there has been a general push in the computing industry to improve battery life through the introduction of more efficient batteries while at the same time finding ways to save power. One such power saving technique is to place circuits that are not actively being used into a low power or sleep mode.

One popular standard to enable device-to-device communication is the Universal Serial Bus (USB) standard. The USB standard defines three low power states that power down increasing numbers of circuits as non-use conditions pass certain thresholds. In particular, a U0 state is considered the generally active state with U1-U3 reflecting low power states and U3 being the least power consumptive. While in these low power states, necessary and sufficient circuitry must remain active to detect wake up events to return the circuit to the generally active U0 state. While the USB standard provides ample opportunity for power saving through the use of the low power states, it should be appreciated that further improvements in power consumption are always welcome in the quest to improve battery life.

SUMMARY OF THE DISCLOSURE

Aspects disclosed in the detailed description include power saving systems and methods for Universal Serial Bus (USB) systems. In an exemplary aspect, when a USB physical layer (PHY) enters a U3 low power state, not only are normal elements powered down, but also circuitry within the USB PHY associated with detection of a low frequency periodic signal (LFPS) wake up signal (this circuitry is sometimes referred to as signal detection (or sigdet) circuitry) is powered down. A low speed reference clock signal is still received by the USB PHY, and a medium speed clock within the USB PHY is activated once per period of the low speed reference clock signal. The medium speed clock activates the signal detection circuitry and samples a line for the LFPS. If no LFPS is detected, the signal detection circuitry and the medium speed clock return to low power until the next period of the low speed reference clock signal. If the LFPS is detected, the USB PHY returns to a U0 active power state. The signal detection circuitry currently consumes over half the power used by the USB PHY during the U3 low power state. By turning off the signal detection circuitry for the majority of the period of the low speed reference clock signal during the U3 low power state, substantial power savings are effectuated. Still further, by turning on the signal detection circuitry once per period of the low speed reference clock signal, the signal detection circuitry is on sufficient amounts of time to detect even the shortest LFPS and keeps latency associated with a return to the U0 active power state to an acceptably low level.

In this regard in one aspect, a method for reducing power consumption in a USB PHY during a U3 power state is disclosed. The method includes, during a U3 power state, receiving a reference clock signal at a USB PHY. The method also includes, during the U3 power state, waking a medium frequency clock in the USB PHY on receipt of an edge in the reference clock signal. The method also includes, during the U3 power state and as a function of operation of the medium frequency clock, waking a signal detection circuit. The method also includes, using the signal detection circuit, detecting a LFPS on a line.

In another aspect, a USB PHY is disclosed. The USB PHY includes an input configured to receive a reference clock signal. The USB PHY also includes a line input configured to receive a LFPS. The USB PHY also includes a medium frequency clock. The USB PHY also includes a signal detection circuit configured to detect the LFPS on the line input. The USB PHY also includes a control system. The control system is configured to, during a U3 low power state, wake the medium frequency clock on receipt of an edge in the reference clock signal. The control system is also configured to, during the U3 low power state and based on the receipt of waking of the medium frequency clock, wake the signal detection circuit. The control system is also configured to receive an indication from the signal detection circuit that the LFPS was detected on the line input.

In another aspect, a USB PHY is disclosed. The USB PHY includes a means for receiving a reference clock signal. The USB PHY also includes a means for receiving a LFPS. The USB PHY also includes a medium frequency clock. The USB PHY also includes a means for detecting the LFPS on the means for receiving the LFPS. The USB PHY also includes a control system. The control system is configured to, during a U3 low power state, wake the medium frequency clock on receipt of an edge in the reference clock signal. The control system is also configured to, during the U3 low power state and based on the receipt of waking of the medium frequency clock, wake the means for detecting the LFPS. The control system is also configured to receive an indication from the means for detecting the LFPS that the LFPS was detected on the means for receiving the LFPS.

DETAILED DESCRIPTION

Figure 1:
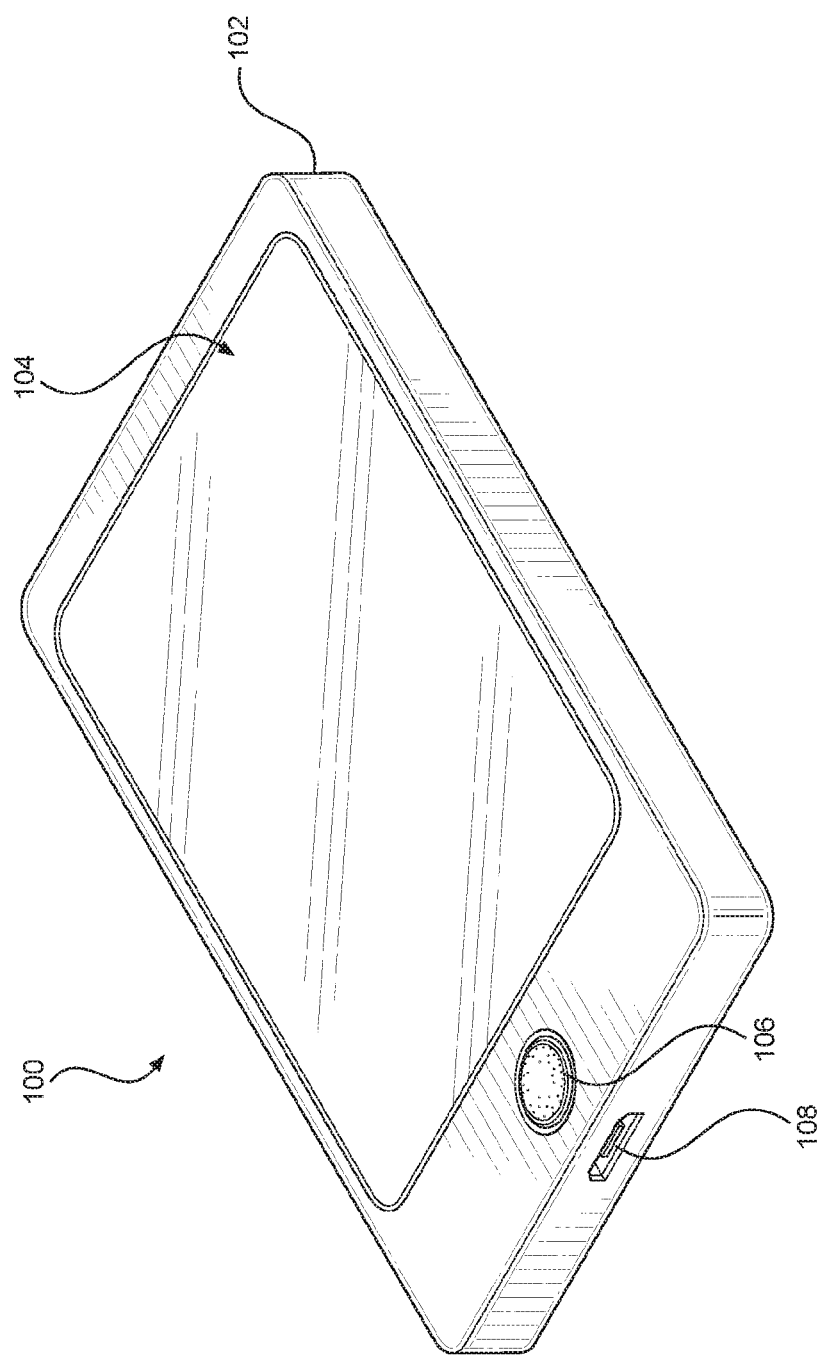
FIG. 1 is a perspective view of an exemplary mobile computing device with a Universal Serial Bus (USB) connector that may incorporate exemplary power saving techniques according to the present disclosure.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include power saving systems and methods for Universal Serial Bus (USB) systems. In an exemplary aspect, when a USB physical layer (PHY) enters a U3 low power state, not only are normal elements powered down, but also circuitry within the USB PHY associated with detection of a low frequency periodic signal (LFPS) wake up signal (this circuitry is sometimes referred to as signal detection (or sigdet) circuitry) is powered down. A low speed reference clock signal is still received by the USB PHY, and a medium speed clock within the USB PHY is activated once per period of the low speed reference clock signal. The medium speed clock activates the signal detection circuitry and samples a line for the LFPS. If no LFPS is detected, the signal detection circuitry and the medium speed clock return to low power until the next period of the low speed reference clock signal. If the LFPS is detected, the USB PHY returns to a U0 active power state. The signal detection circuitry currently consumes over half the power used by the USB PHY during the U3 low power state. By turning off the signal detection circuitry for the majority of the period of the low speed reference clock signal during the U3 low power state, substantial power savings are effectuated. Still further, by turning on the signal detection circuitry once per period of the low speed reference clock signal, the signal detection circuitry is on sufficient amounts of time to detect even the shortest LFPS and keeps latency associated with a return to the U0 active power state to an acceptably low level.

In this regard, FIG. 1 is a perspective view of an exemplary mobile computing device 100. The mobile computing device 100 may be a cellular phone, smart phone, tablet, laptop computer, or the like. As illustrated, the mobile computing device 100 is a smart phone having a housing 102 with a touch screen display 104 and command button 106 that form a user interface for the mobile computing device 100. While not specifically illustrated, it should be appreciated that the mobile computing device 100 may include one or more speakers and one or more microphones as part of the user interface. In addition to the user interface, the housing 102 may support a USB receptacle 108. In an exemplary aspect, the USB receptacle 108 may be a micro-A or micro-B receptacle configured to support USB 3.0 or USB 3.1. As alluded to elsewhere, the mobile computing device 100 may operate in active power modes and in a sleep or low power mode. Further, even if portions of the mobile computing device 100 are active, other portions may be put into a sleep or low power mode based on operational demands and use. In an exemplary aspect of the present disclosure, the USB PHY associated with the USB receptacle 108 may be put into one of multiple low power modes.

In particular, the USB standard defines U0 as an active power state and defines U1-U3 as low power states with increasing numbers of elements unpowered as the USB PHY transitions from U1 to U3. In conventional systems, when the USB PHY is in the U3 state, the USB PHY maintains power to a signal detection circuit that detects a low frequency periodic signal (LFPS) on super speed lanes of a USB bus. When the signal detection circuit detects the LFPS, the signal detection circuit wakes the USB PHY and initiates a process through which the USB PHY is returned to the U0 active state. Within the context of the U3 state, the signal detection circuit consumes relatively large amounts of power. In some instances over half of the power consumed in the U3 state is consumed by the signal detection circuit. Exemplary aspects of the present disclosure allow the signal detection circuit to be depowered for the majority of the time that the USB PHY spends in the U3 state. Further, a medium frequency clock internal to the USB PHY may also be depowered, providing further power savings. These elements are selectively activated by a low frequency clock signal and allowed to sample the super speed lines to detect the LFPS. If no LFPS is detected, both elements return to a depowered state until the next sampling instance. Accordingly, substantial power savings may be effectuated.

Figure 2:
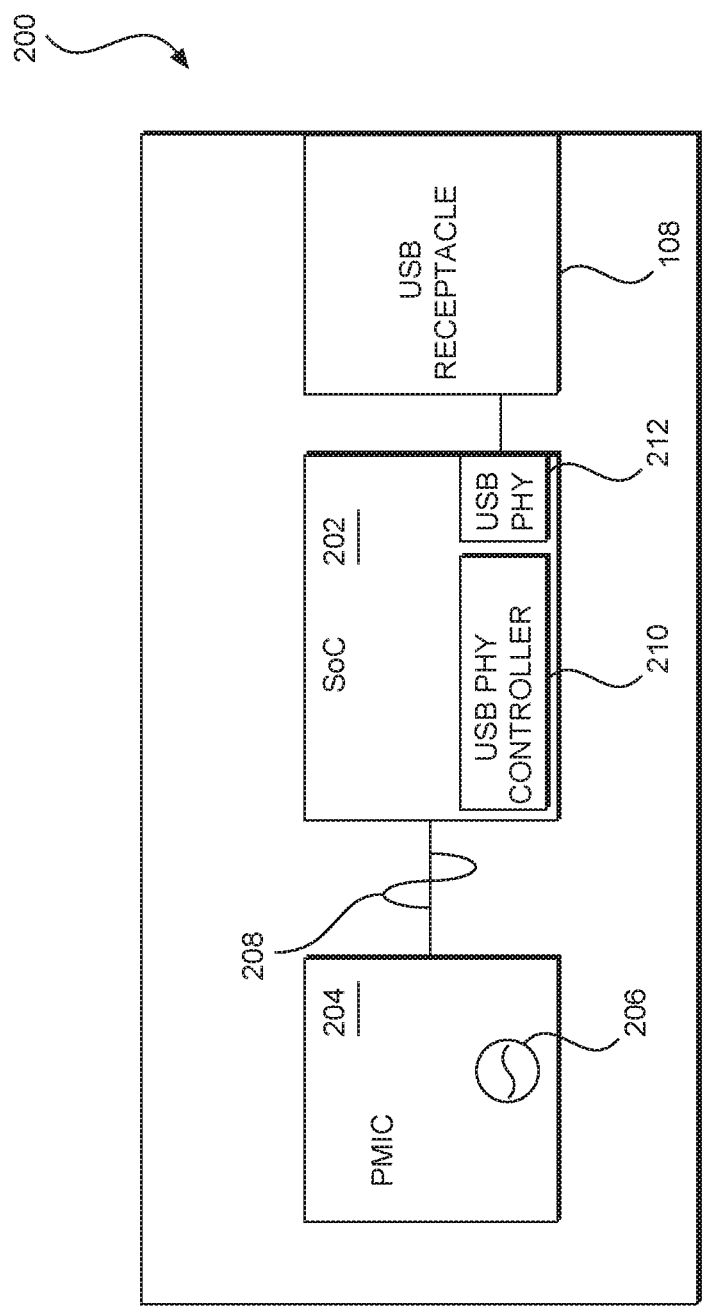
FIG. 2 is a simplified block diagram of circuitry within a mobile computing device operating with the USB connector of FIG. 1.

In this regard, FIG. 2 illustrates a simplified block diagram of elements within the mobile computing device 100 of FIG. 1. In particular, FIG. 2 illustrates a circuit board 200 having integrated circuits (ICs) positioned thereon as well as the USB receptacle 108. The USB receptacle 108 is coupled to a system on a chip (SoC) 202, which is in turn coupled to a power management IC (PMIC) 204. The PMIC 204 includes a crystal oscillator 206 that generates a low frequency clock signal 208, which is provided to the SoC 202. In an exemplary aspect, the low frequency clock signal 208 is a thirty-two kilohertz (32 kHz) clock signal. In some alternate aspects, the PMIC 204 may be incorporated into the SoC 202.

With continued reference to FIG. 2, the SoC 202 may include a control system 210 and a USB PHY 212. In an exemplary aspect, the control system 210 controls the USB PHY 212 and may be referred to as a USB PHY controller or a MAC controller. The control system 210 may be coupled to the USB PHY 212 through a system network on chip (SNoC) (not illustrated) or other connections as needed or desired. Further, it should be appreciated that the low frequency clock signal 208 may be passed to either the control system 210 or the USB PHY 212, or both. It should be appreciated that since the crystal oscillator 206 is external to the USB PHY 212, the low frequency clock signal 208 may sometimes be referred to as an external clock signal. Further, changes in the power state of the USB PHY 212 do not affect the crystal oscillator 206 and thus, the low frequency clock signal 208 is available even when the USB PHY 212 has transitioned to a low power state such as U1-U3.

Figure 3:
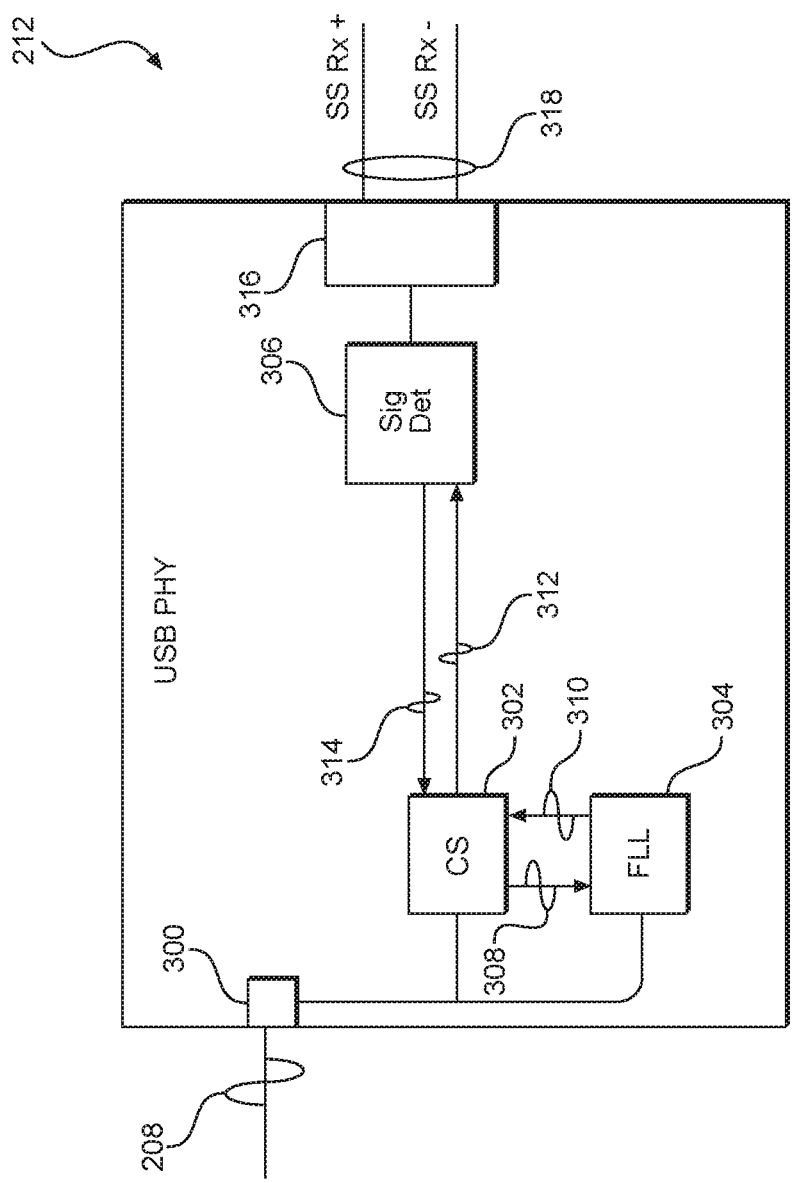
FIG. 3 is a simplified block diagram of a USB physical layer (PHY) associated with the USB connector of FIG. 1.

Delving into more detail, FIG. 3 illustrates the USB PHY 212 of FIG. 2. The USB PHY 212 may include a clock input 300 that receives the low frequency clock signal 208. The clock input 300 is sometimes referred to as a means for receiving a clock signal. The low frequency clock signal 208 is shared from the clock input 300 to a control system 302 and a frequency locked loop (FLL) 304. The control system 302 is bidirectionally communicatively connected to the FLL 304 and a signal detection (sometimes referred to as sigdet) circuit 306. In particular, the control system 302 passes an FLL enable signal (sometimes labeled fll_en) 308 to the FLL 304. The FLL enable signal 308 enables the FLL 304, waking the FLL 304 from a sleep or low power mode. The control system 302 receives an FLL clock signal (sometimes labeled fll_clk) 310 from the FLL 304. The control system 302 also passes a receive circuit enable signal (sometimes labeled rx_sigdet_en) 312 to the signal detection circuit 306 and receives a receive signal detected signal (sometimes labeled rx_sigdet) 314. The signal detection circuit 306 is sometimes referred to as a means for detecting an LFPS. The signal detection circuit 306 is coupled to a line input 316 which is configured to receive a SuperSpeed signal such as a differential SuperSpeed signal from differential line 318. The line input 316 is sometimes referred to as a means for receiving an LFPS. It should be appreciated that the USB standard defines the manner in which the USB PHY 212 would receive the LFPS. In particular, the LFPS is provided on the differential line 318. The FLL 304 may generate a clock signal. As used herein, this clock signal from the FLL 304 is a medium frequency clock signal. Medium in this case because the signal is around ten to twenty megahertz (10-20 MHz), which is higher than the 32 kHz of the low frequency clock signal 208, but substantially lower than the five gigahertz (5 GHz) of USB 3.0 SuperSpeed data.

Figure 4:
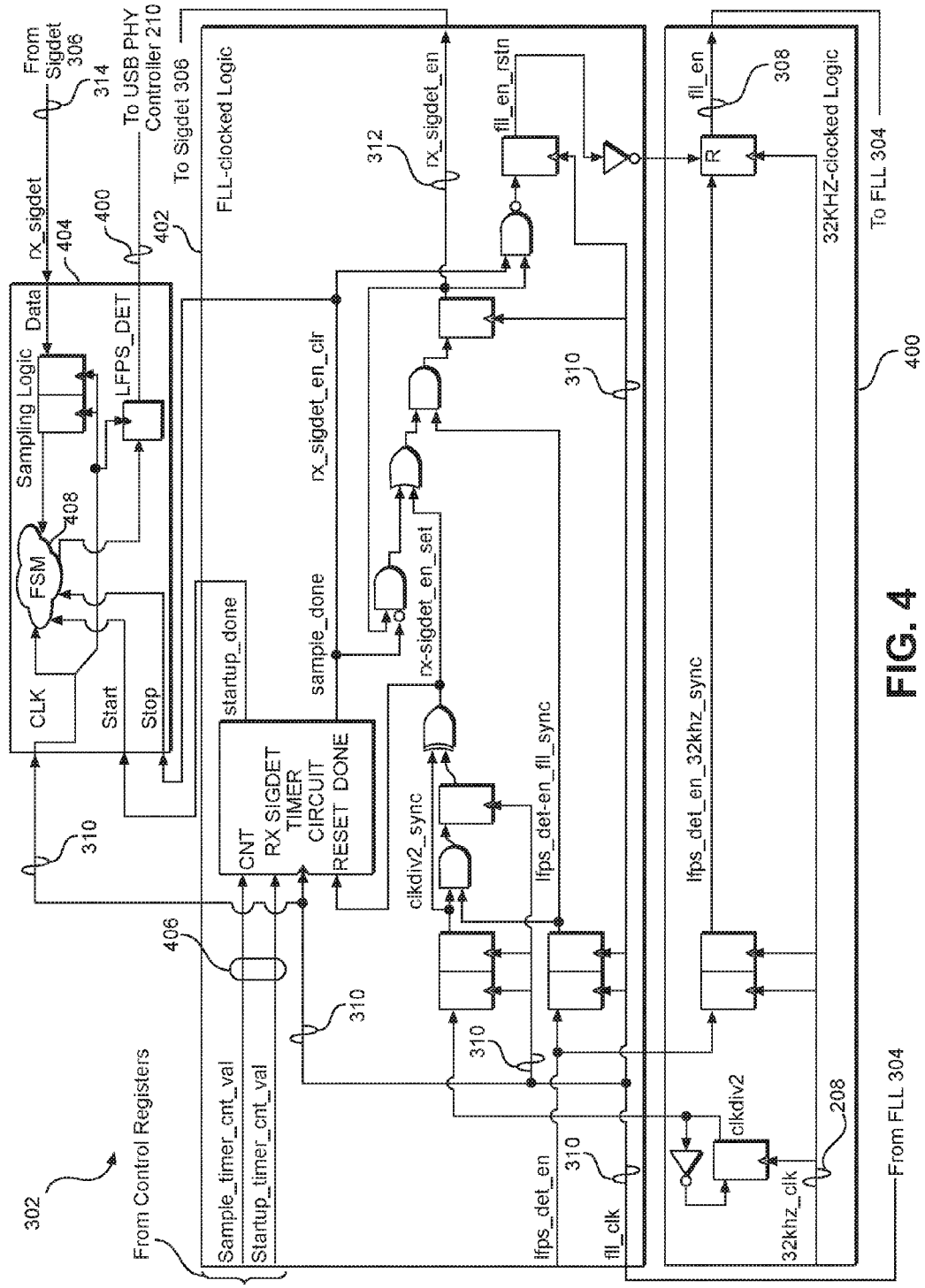
FIG. 4 is a simplified block diagram of elements within the USB PHY of FIG. 3 illustrating exemplary power saving techniques according to the present disclosure.

FIG. 4 illustrates the control system 302 of FIG. 3. In particular, the control system 302 includes a low frequency clock clocked portion 400, an FLL clocked portion 402, and a sampling logic 404. The low frequency clock clocked portion 400 receives the low frequency clock signal 208 and selectively outputs the FLL enable signal 308 that turns on the FLL 304. The FLL clocked portion 402 receives the FLL clock signal 310 from the FLL 304 and outputs the receive circuit enable signal 312, which turns on the signal detection circuit 306. Additionally, the FLL clocked portion 402 receives timer control signals 406 from control registers (not illustrated). The sampling logic 404 also receives the FLL clock signal 310, which is used by a finite state machine (FSM) 408 together with the receive signal detected signal 314 from the signal detection circuit 306 to determine whether to output an LFPS detection signal (sometimes labeled LFPS_DET) 410 to the USB PHY controller 210. The USB PHY controller 210 then controls the wakeup from U3.

Figure 5:
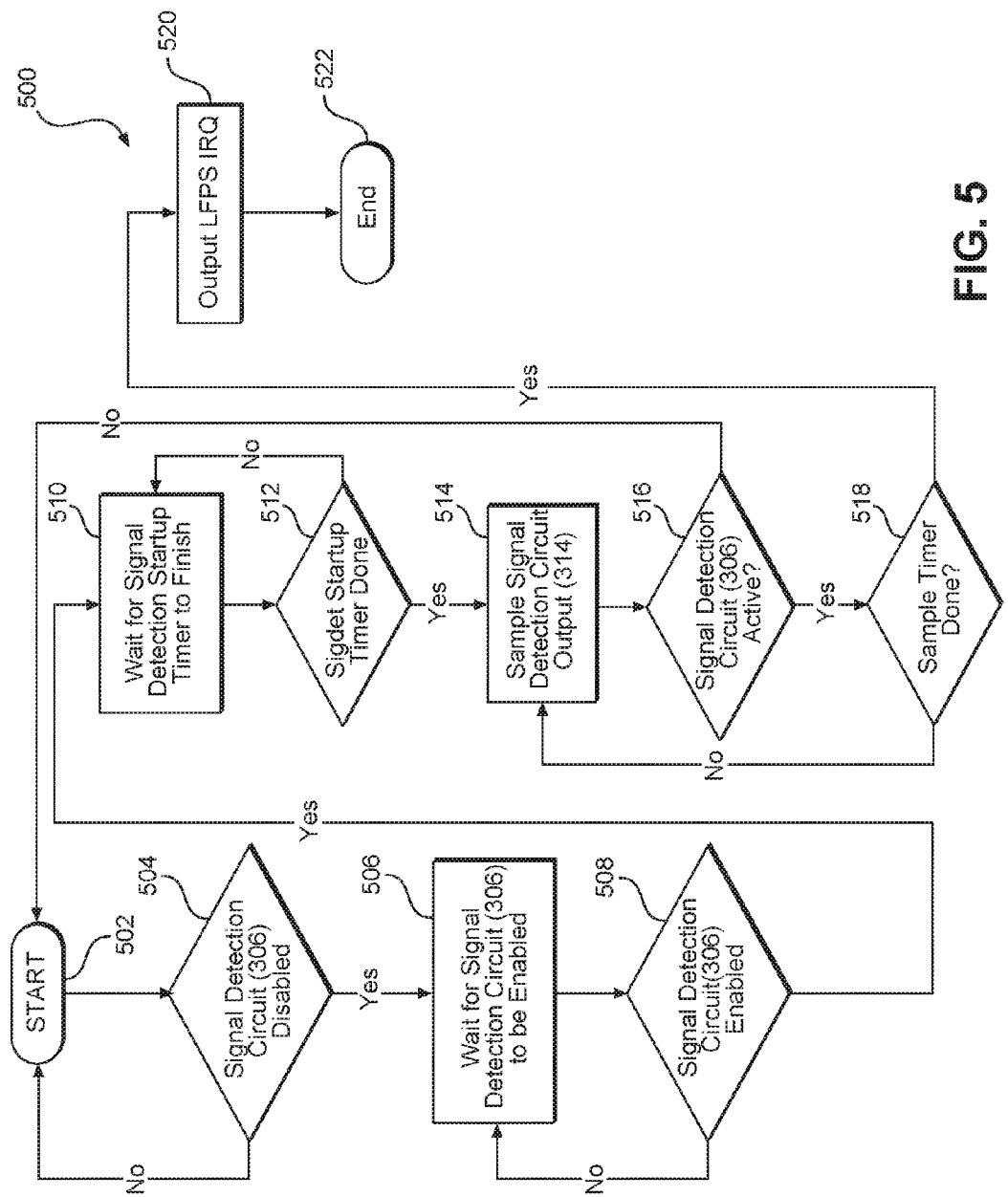
FIG. 5 is a flowchart of a process associated with an exemplary power saving technique of the present disclosure.

Against the backdrop of the hardware described above, FIG. 5 illustrates a flowchart of process 500 according to an exemplary aspect of the present disclosure. The process 500 starts (block 502) and inquires whether the signal detection circuit 306 is disabled (block 504). If the answer to block 504 is no, the process 500 loops until a positive answer is generated at block 504. Once the answer to block 504 is yes, the process 500 waits until the signal detection circuit 306 is enabled (block 506 and block 508). The process by which the signal detection circuit 306 is enabled is explored in greater detail below with reference to process 600 and FIG. 6. The process 500 then waits for a signal detection startup timer (illustrated but not labeled in FIG. 4) to finish (block 510). The process 500 queries whether the signal detection startup timer is done (block 512), and once the answer to block 512 is yes, the sampling logic 404 samples the receive signal detected signal 314 from the signal detection circuit 306 (block 514). While the signal detection circuit 306 is active (block 516) and senses activity (i.e., there is an LFPS at the line input 316), the process 500 queries whether a sample timer is done (block 518). If the LFPS is present for the entire sample timer, then the LFPS is determined to be valid. That is, once the sample timer is done, the process 500 outputs an LFPS interrupt (IRQ) (block 520) and the process 500 ends (block 522). However, if the signal detection circuit 306 ever senses inactivity (the no branch from block 516) while the sample timer is still counting, then the LFPS was terminated or is invalid, and the process 500 starts over at the beginning.

Figure 6:
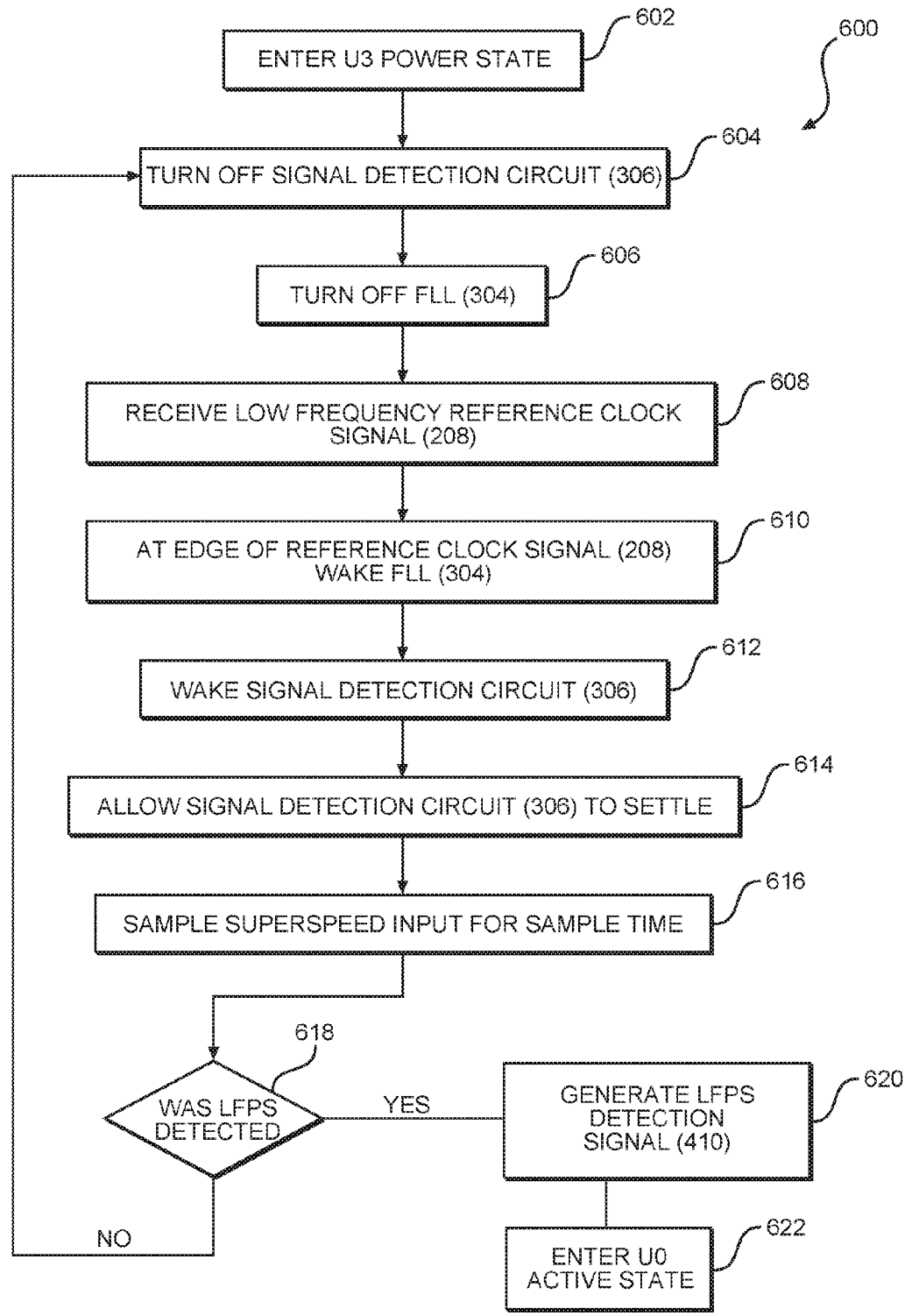
FIG. 6 is a second flowchart illustrating additional steps associated with exemplary power saving techniques of the present disclosure.

Process 600 illustrated in FIG. 6 provides additional detail about entering and leaving the U3 power state and how the LFPS is detected. In this regard, the process 600 begins when the USB PHY 212 enters a U3 power state (block 602) according to the USB standard. On entry into the U3 power state, the USB PHY 212 depowers many elements and, in particular, turns off the signal detection circuit 306 (block 604) and turns off the FLL 304 (block 606). However, the USB PHY 212 still receives the low frequency clock signal 208 from the crystal oscillator 206 (block 608). At an edge (either rising or falling) of the low frequency clock signal 208, the control system 302 wakes the FLL 304 (block 610) with the FLL enable signal 308. The output of the FLL 304 is passed back to the control system 302, which wakes the signal detection circuit 306 (block 612) with the receive circuit enable signal 312. In an exemplary aspect, it takes about two microseconds for the signal detection circuit 306 to settle. Accordingly, the process 600 allows the signal detection circuit 306 to settle (block 614). The signal detection circuit 306 then samples the SuperSpeed input for a sample time (block 616). In an exemplary aspect, this sample time is one microsecond. If the LFPS was not detected at block 618 for the entire duration of the sample time, then the process 600 turns off the FLL 304 and the signal detection circuit 306 by returning to block 604. If, however, the LFPS was detected at block 618 for the entire duration of the sample time, then the signal detection circuit 306 generates the LFPS detection signal 410 (block 620), and the USB PHY controller 210 causes the USB PHY 212 to enter a U0 active state (block 622).

It should be appreciated that the LFPS is defined by the USB standard to be between 80 microseconds and 10 milliseconds in duration. If the low frequency clock signal 208 is 32 kHz, that means that the signal detection circuit 306 should wake and sample at least twice in any 80 microsecond period. This sampling frequency provides a redundant check to detect the LFPS, even if the LFPS is on its shortest period. Accordingly, this arrangement provides a high probability of detecting the LFPS with acceptable latency. Additionally, by powering down the signal detection circuit 306 and the FLL 304 for the majority of the time, substantial power savings are effectuated.

The power saving systems and methods according to aspects disclosed herein may be provided in or integrated into any processor-based device that includes a USB PHY. Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 7:
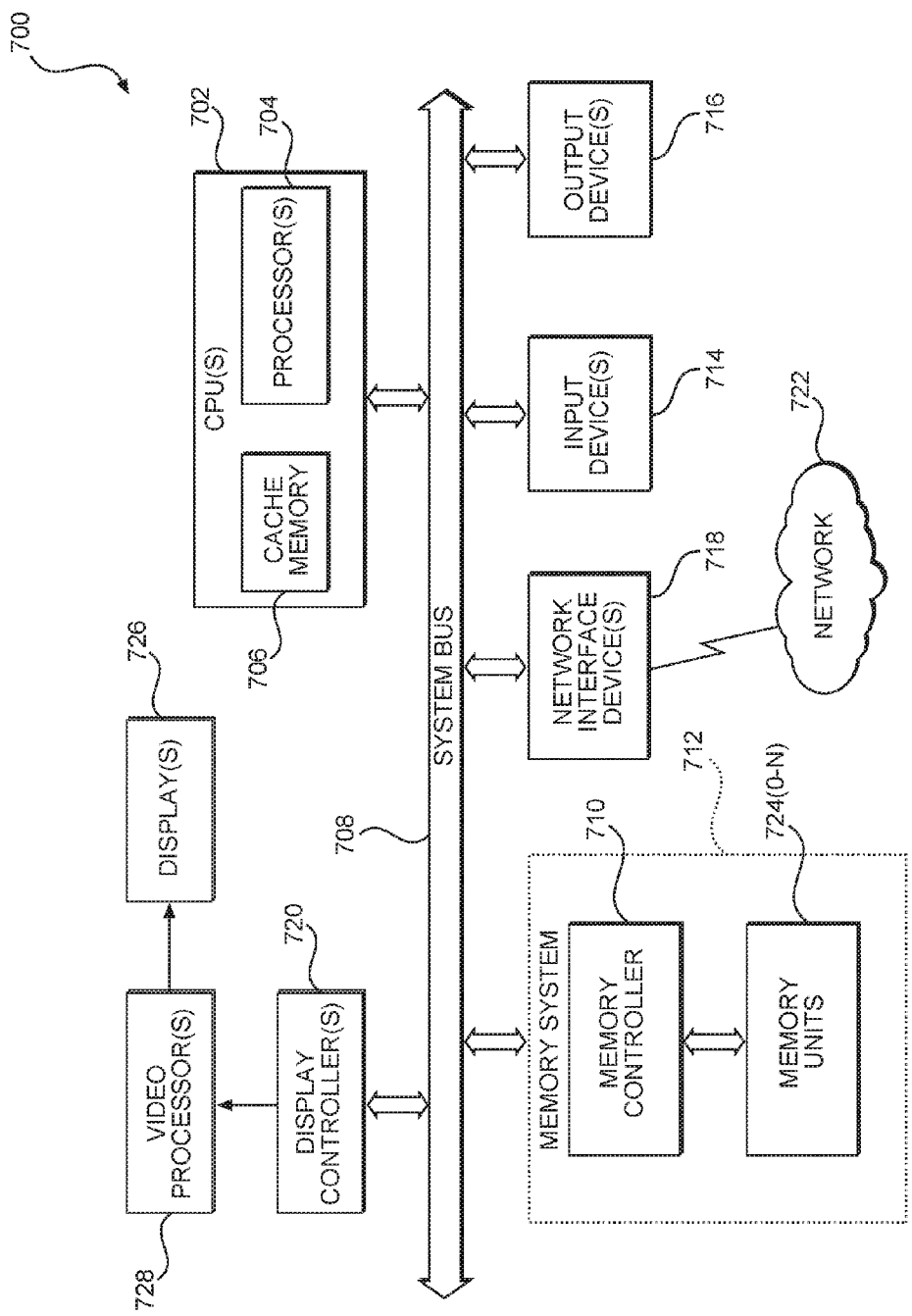
FIG. 7 is a block diagram of an exemplary processor-based system that can include the power saving USB PHY of FIG. 3.

In this regard, FIG. 7 illustrates an example of a processor-based system 700 that can employ the USB PHY 212 illustrated in FIG. 2. In this example, the processor-based system 700 includes one or more central processing units (CPUs) 702, each including one or more processors 704. The CPU(s) 702 may have cache memory 706 coupled to the processor(s) 704 for rapid access to temporarily stored data. The CPU(s) 702 is coupled to a system bus 708 and can intercouple master and slave devices included in the processor-based system 700. As is well known, the CPU(s) 702 communicates with these other devices by exchanging address, control, and data information over the system bus 708. For example, the CPU(s) 702 can communicate bus transaction requests to a memory controller 710 as an example of a slave device. Although not illustrated in FIG. 7, multiple system buses 708 could be provided, wherein each system bus 708 constitutes a different fabric.

Other master and slave devices can be connected to the system bus 708. As illustrated in FIG. 7, these devices can include a memory system 712, one or more input devices 714, one or more output devices 716, one or more network interface devices 718, and one or more display controllers 720, as examples. The input device(s) 714 can include any type of input device, including, but not limited to, input keys, switches, voice processors, etc. The output device(s) 716 can include any type of output device, including, but not limited to, audio, video, other visual indicators, etc. The network interface device(s) 718 can be any devices configured to allow exchange of data to and from a network 722. The network 722 can be any type of network, including, but not limited to, a wired or wireless network, a private or public network, a local area network (LAN), a wireless local area network (WLAN), a wide area network (WAN), a BLUETOOTHTM network, and the Internet. The network interface device(s) 718 can be configured to support any type of communications protocol desired. The memory system 712 can include one or more memory units 724(0-N).

The CPU(s) 702 may also be configured to access the display controller(s) 720 over the system bus 708 to control information sent to one or more displays 726. The display controller(s) 720 sends information to the display(s) 726 to be displayed via one or more video processors 728, which process the information to be displayed into a format suitable for the display(s) 726. The display(s) 726 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for reducing power consumption in a Universal Serial Bus (USB) physical layer (PHY) during a U3 power state, the method comprising:

during a U3 power state, receiving a reference clock signal at a USB PHY;

during the U3 power state, waking a medium frequency clock in the USB PHY on receipt of an edge in the reference clock signal;

during the U3 power state and as a function of operation of the medium frequency clock, waking a signal detection circuit; and using the signal detection circuit, detecting a low frequency periodic signal (LFPS) on a line.

2. The method of claim 1, wherein receiving the reference clock signal comprises receiving a thirty-two kilohertz (32 kHz) reference clock signal.

3. The method of claim 1, wherein receiving the reference clock signal comprises receiving the reference clock signal from a power management integrated circuit (PMIC) having a crystal oscillator.

4. The method of claim 1, further comprising entering the U3 power state.

5. The method of claim 4, further comprising turning off the signal detection circuit concurrent with entrance into the U3 power state.

6. The method of claim 1, wherein waking the medium frequency clock comprises waking a frequency locked loop (FLL) clock source.

7. The method of claim 1, further comprising placing the medium frequency clock into a low power state when entering the U3 power state.

8. The method of claim 1, wherein waking the medium frequency clock in the USB PHY on the receipt of the edge in the reference clock signal comprises waking the medium frequency clock on a rising edge.

9. The method of claim 1, wherein waking the medium frequency clock in the USB PHY on the receipt of the edge in the reference clock signal comprises waking the medium frequency clock on a falling edge.

10. The method of claim 1, further comprising, on detection of the LFPS, waking the USB PHY to a U0 active power state.

11. The method of claim 10, wherein waking the USB PHY to the U0 active power state comprises generating an interrupt at a control system within the USB PHY and passing the interrupt to a USB PHY controller.

12. The method of claim 1, wherein waking the medium frequency clock comprises waking the medium frequency clock for about four microseconds.

13. The method of claim 12, wherein detecting the LFPS on the line comprises sampling the line for about one microsecond.

14. The method of claim 12, wherein waking the medium frequency clock comprises allowing the medium frequency clock to settle for about two microseconds of the about four microseconds.

15. A Universal Serial Bus (USB) physical layer (PHY), comprising:

an input configured to receive a reference clock signal;

a line input configured to receive a low frequency periodic signal (LFPS);

a medium frequency clock;

a signal detection circuit configured to detect the LFPS on the line input; and a control system configured to:

during a U3 low power state, wake the medium frequency clock on receipt of an edge in the reference clock signal;

during the U3 low power state and based on the receipt of waking of the medium frequency clock, wake the signal detection circuit;

receive an indication from the signal detection circuit that the LFPS was detected on the line input.

16. The USB PHY of claim 15, wherein the medium frequency clock comprises a frequency locked loop (FLL) clock source.

17. The USB PHY of claim 15, wherein the reference clock signal comprises a thirty-two kilohertz (32 kHz) clock signal.

18. The USB PHY of claim 15, wherein the control system is further configured to turn off the signal detection circuit concurrent with entrance into the U3 low power state.

19. The USB PHY of claim 15, wherein the control system is further configured to place the medium frequency clock into a low power state when entering the U3 low power state.

20. The USB PHY of claim 15, wherein the control system is further configured to, on detection of the LFPS, output an interrupt indicating that a USB PHY controller is to wake the USB PHY to a U0 active power state.

21. The USB PHY of claim 15, wherein the control system is configured to wake the medium frequency clock for about four microseconds.

22. The USB PHY of claim 21, wherein the signal detection circuit is configured to sample the line input for the LFPS for about one microsecond after waking.

23. The USB PHY of claim 15 integrated into an integrated circuit (IC).

24. The USB PHY of claim 15 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a server; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

25. A Universal Serial Bus physical layer (PHY), comprising:

a means for receiving a reference clock signal;

a means for receiving a low frequency periodic signal (LFPS);

a medium frequency clock;

a means for detecting the LFPS on the means for receiving the LFPS; and a control system configured to:

during a U3 low power state, wake the medium frequency clock on receipt of an edge in the reference clock signal;

during the U3 low power state and based on the receipt of waking of the medium frequency clock, wake the means for detecting the LFPS;

receive an indication from the means for detecting the LFPS that the LFPS was detected on the means for receiving the LFPS.

* * * * *